United States Patent
Brett et al.

(10) Patent No.: US 7,061,543 B1
(45) Date of Patent: Jun. 13, 2006

(54) METHOD AND CIRCUIT FOR IMAGE-IN-IMAGE OVERLAY

(75) Inventors: Maik Brett, Munich (DE); Manfred Mende, Unterhaching (DE)

(73) Assignee: Micronas GmbH, Freiburg (DE)

( * ) Notice: Subject to any disclaimer, the term of this patent is extended or adjusted under 35 U.S.C. 154(b) by 0 days.

(21) Appl. No.: 09/806,003

(22) PCT Filed: Sep. 17, 1999

(86) PCT No.: PCT/DE99/02994

§ 371 (c)(1),
(2), (4) Date: Jun. 15, 2001

(87) PCT Pub. No.: WO00/18115

PCT Pub. Date: Mar. 30, 2000

(30) Foreign Application Priority Data

Sep. 23, 1998 (DE) ................................ 198 43 660

(51) Int. Cl.
*H04N 5/272* (2006.01)
(52) U.S. Cl. .................................................... 348/565
(58) Field of Classification Search ................ 348/565, 348/564, 563, 567, 715, 719, 716; 345/619, 345/629, 638, 545–7
See application file for complete search history.

(56) References Cited

U.S. PATENT DOCUMENTS

| | | | |
|---|---|---|---|
| 4,987,493 A * | 1/1991 | Canfield et al. ............ | 348/565 |
| 5,313,303 A * | 5/1994 | Ersoz et al. .............. | 348/439.1 |
| 5,353,067 A | 10/1994 | Kaji | |
| 5,355,150 A | 10/1994 | Murakami | |
| 5,369,442 A * | 11/1994 | Braun ........................ | 348/567 |
| 5,432,560 A * | 7/1995 | Ersoz et al. ................ | 348/565 |
| 5,483,296 A * | 1/1996 | Nonweiler .................. | 348/719 |

(Continued)

FOREIGN PATENT DOCUMENTS

DE 29 37 133 A1 9/1979

(Continued)

OTHER PUBLICATIONS

Funkschau 26/1992, Megavision-Bildverarbeitungssystem: "Neue Chips fur besseres Fernsehen", pp. 72-75.

*Primary Examiner*—Paulos M. Natnael
(74) *Attorney, Agent, or Firm*—Peter F. Corless; Steven M. Jensen; Edwards Angell Palmer & Dodge, LLP

(57) ABSTRACT

The invention relates to a method and a circuit arrangement for picture-in-picture insertion, in which a sequence of insertion pictures (Kj=K1,K2, . . . ) is read, with vertical decimation (VD≧1), into a memory device (S) and subsequently read out, the sequence of insertion pictures (Kj) read out is inserted into a sequence of main pictures (Hi=H1, H2, . . . ) and the memory device (S) is continuously overwritten by the insertion pictures.

In order to prevent the occurrence of a seam during the insertion of the insertion pictures into the main pictures in a cost-effective manner and with a relatively low outlay on apparatus,
the memory device (S) is subdivided into memory segments (X,Y,Z) which are continuously cyclically overwritten by the insertion pictures,
the memory device (S) has a storage capacity of less than two insertion pictures, and
a decision is made as to whether the currently written insertion picture (Kj) or the immediately preceding insertion picture (Kj–1) is read out.

9 Claims, 2 Drawing Sheets

U.S. PATENT DOCUMENTS

| | | | |
|---|---|---|---|
| 5,729,303 A * | 3/1998 | Oku et al. | 348/716 |
| 5,850,266 A * | 12/1998 | Gimby | 348/558 |
| 5,923,385 A * | 7/1999 | Mills et al. | 348/715 |
| 6,356,313 B1 * | 3/2002 | Champion et al. | 348/558 |
| 6,493,036 B1 * | 12/2002 | Fernandez | 348/561 |
| 6,559,896 B1 * | 5/2003 | Zwartenkot et al. | 348/714 |
| 6,870,572 B1 * | 3/2005 | Brett et al. | 348/567 |
| 6,873,370 B1 * | 3/2005 | Brett et al. | 348/567 |
| 6,950,146 B1 * | 9/2005 | Brett et al. | 348/556 |

FOREIGN PATENT DOCUMENTS

| | | |
|---|---|---|
| DE | 42 31 308 C1 | 9/1992 |
| EP | 0 739 130 | 5/2000 |
| JP | 61-171293 | 8/1986 |
| JP | 64-86769 | 3/1989 |
| JP | 1-272270 | 10/1989 |

* cited by examiner

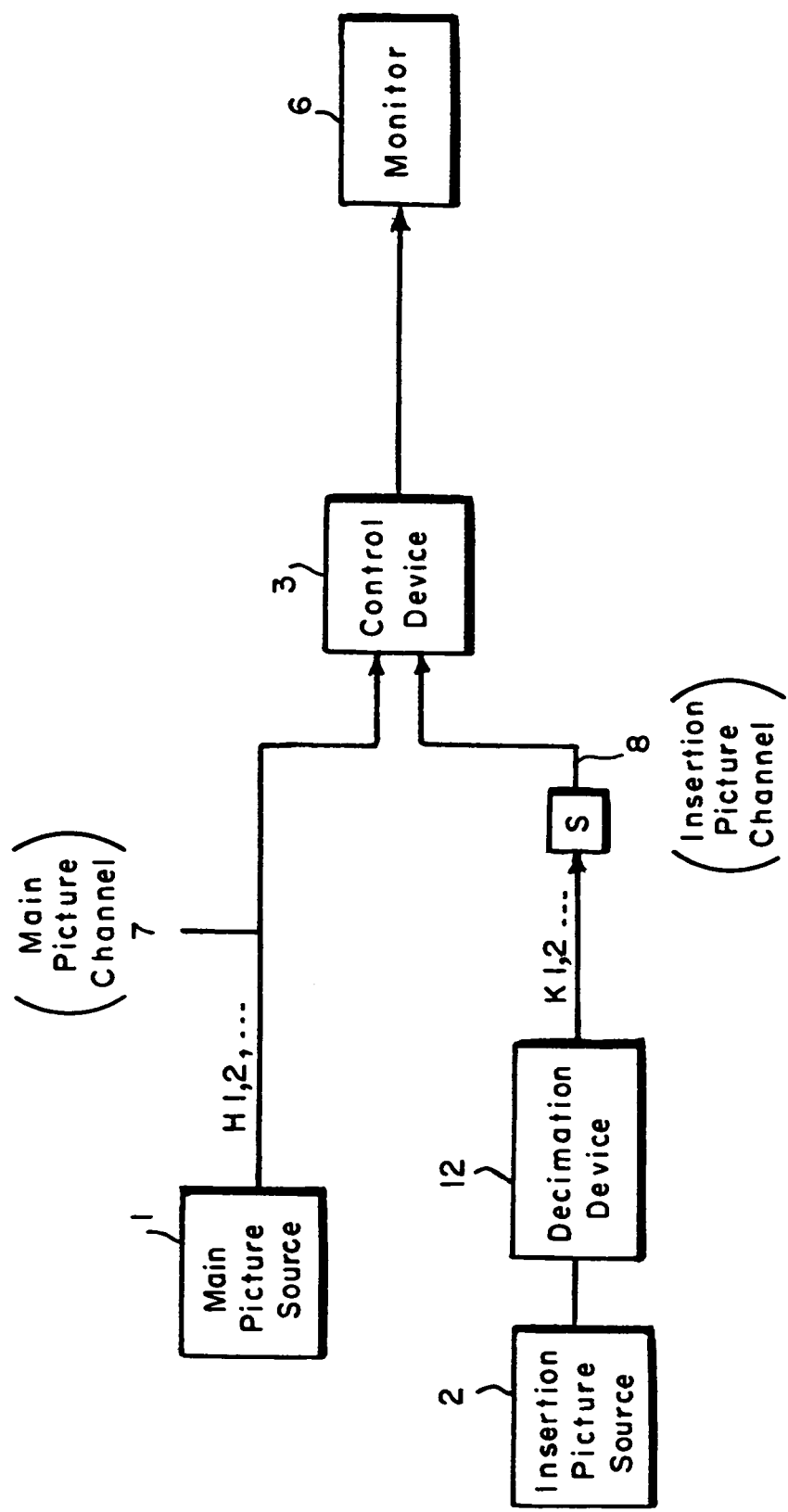

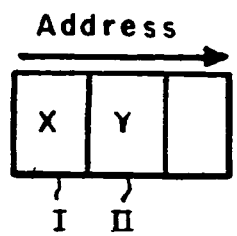 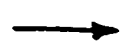 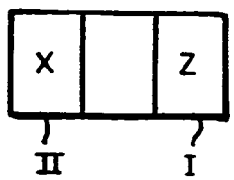  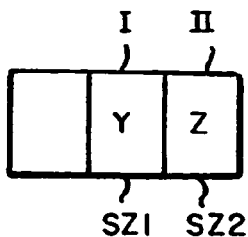
FIG.2a  FIG.2b  FIG.2c
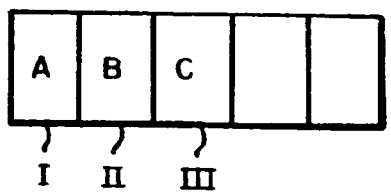 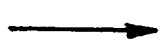 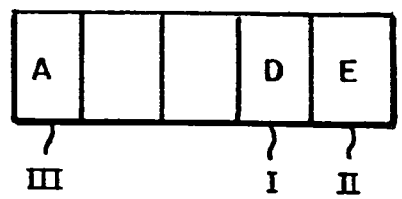
FIG. 3

METHOD AND CIRCUIT FOR IMAGE-IN-IMAGE OVERLAY

BACKGROUND OF THE INVENTION

1. Field of the Invention

The invention relates to a method for picture-in-picture insertion and to a circuit arrangement for picture-in-picture insertion.

2. Description of Related Art

In the case of such picture-in-picture (PIP) insertion, a smaller insertion picture (small picture) is inserted into a larger main picture. The insertion picture is decimated in accordance with the size reduction and is continuously read into a memory device, older stored pictures being overwritten, and then the insertion pictures are read out in a manner employing synchronization with the main pictures. Accordingly, the read-out speed of the insertion pictures is generally higher than the writing speed. In this case, the main picture and the insertion picture may, in a known manner, be fields which are used for displaying a monitor picture.

At specific phase angles of the rasters of the main picture and of the small picture, the higher read-out speed can lead, inter alia, to the read-out pointer overtaking the write pointer and reading out a previous picture stored in the memory device, with the result that a seam occurs in the middle of a displayed small picture and in part the preceding insertion picture is read out. If both insertion pictures originate from different motion phases, a disturbing effect results since moving objects through which the seam runs are displayed with distortion. If the frequencies of the pictures of the insertion channel and main channel correspond only approximately, the result is slow drifting of the disturbance location, which is found to be particularly unpleasant.

EP 0 739 130 A2 describes a method for eliminating this seam by storing two fields of a small picture, with the result that the field that can be read is always exactly the one which is currently not being written, and, consequently, the read pointer cannot overtake the write pointer. A first and a second memory, which each store a field, are provided for this purpose. This method has the disadvantage, however, that a storage capacity of two insertion pictures or fields is necessary, which entails corresponding costs.

BRIEF SUMMARY OF THE INVENTION

Accordingly, the invention is based on the object of providing a method and a circuit arrangement for picture-in-picture insertion with which the occurrence of a seam in the insertion picture can be prevented in a cost-effective manner and with a relatively low outlay on apparatus.

The invention is based on the concept that it is not necessary, in principle, to store two whole insertion pictures in order to prevent the write pointer from being overtaken by the read pointer. Instead of using a storage capacity of two insertion pictures, a smaller memory device is subdivided into a suitable number of segments, and suitable decision-making is effected to stipulate whether the currently written or the preceding insertion picture is read out.

Consequently, according to the invention, in contrast to the use of two separate memory segments for the currently written and the preceding insertion picture, if appropriate even the currently written insertion picture is read out if it is ensured that the read pointer does not overtake the write pointer.

For this purpose, memory segments which, in particular, are the same size can be cyclically overwritten in a predetermined order since, in particular, good periodicity of the operation can also be ensured by this means.

BRIEF DESCRIPTION OF THE DRAWINGS

The invention is explained in more detail below using a number of embodiments with reference to the accompanying drawings in which:

FIG. 1 is a block diagram of a circuit arrangement according to the invention;

FIGS. 2a, 2b, and 2c are illustrations of a memory device according to a first embodiment of the invention; and FIG. 3 is an illustration of a memory device according to a second embodiment of the invention.

DETAILED DESCRIPTION OF THE INVENTION

In accordance with FIG. 1, a sequence of main pictures Hi=H1, H2, H3, . . . are output from a main picture source 1 via a main picture channel 7 to a control device 3. Correspondingly, from an insertion picture source 2, a sequence of insertion pictures Kj=K1, K2, K3, . . . decimated by a decimation device 12, i.e. reduced in size relative to the main pictures, are output to a memory device S and buffer-stored. In this case, both the main pictures Hi and the insertion pictures Kj are fields which are combined e.g. in a line-offset manner to form the overall monitor picture. Afterward, the sequence of small pictures is read out and forwarded to the control device 3 via an insertion picture channel 8. If an asynchronous main picture source 1 and insertion picture source 2 are used, the read-out operation of the memory device S is effected in a manner exhibiting synchronization with the main pictures Hi. On account of the decimation, in particular the vertical decimation, the read-out of the insertion pictures Kj from the memory device by the control device 3 takes place more rapidly than the operation of writing to the memory device. The control device 3 combines the main pictures Hi and insertion pictures Kj to form an overall picture which is reproduced on a monitor 6.

One-quarter (¼) picture-in-picture insertion is assumed below, where the small picture is correspondingly decimated in each case by the factor 2 in the horizontal and vertical. According to the invention, it is provided for this purpose that the memory device has a storage capacity of 1.5 fields (decimated relative to the main pictures) and, in accordance with FIGS. 2a, 2b, and 2c, is subdivided into three memory segments X, Y and Z, all three segments being the same size, i.e. each having a storage capacity of 0.5 field (decimated relative to the main pictures) and being continuously overwritten in this cyclic order. Consequently, a writing start segment I and a second writing segment II are in each case required for a field.

Accordingly, in a first storage operation in accordance with FIG. 2a, a memory area formed from the start writing segment X and the second writing segment Y is written to the first field K1. The second field K2 is correspondingly written to the start writing segment Z and the second writing segment X in the subsequent storage operation in accordance with FIG. 2b, the start segment of the first field K1 already being overwritten in the process of writing to the second writing segment X. During the third storage operation, the field K3 is correspondingly written to the start writing segment Y and the second writing segment Z in accordance with FIG. 2c. Consequently, at the instant when, in FIG. 2c, the write pointer is located in the start segment Y, in the location designated by SZ1, the second half of the first field K1 is overwritten, i.e., at this instant, K1 is still partly present, K2 is completely present and K3 is currently being written Y.

For the read-out operation it must be ensured that, on the one hand, a whole field is read out and, on the other hand, the read pointer does not overtake the write pointer. For this purpose, a decision must be made as to whether the currently written field Kj or the immediately preceding field Kj−1 is read out. Since the difference in the writing and read-out speed is essentially determined by the vertical decimation VD, where VD is a natural number, the decision as to which field is to be read out can be made dependent in each case on VD and on the position of the write pointer in the currently written field.

This position of the write pointer generally depends on the position of the small picture in the main picture and hence primarily on the phase angle of the small picture and main picture, the read pointer generally being fixedly coupled to the main picture via the insertion position.

In the case of a vertical decimation of VD=2, the read-out speed is about twice as high as the writing speed, with the result that the read pointer would overtake the write pointer in the currently written field if the write pointer has only written less than half of the field, i.e. is still located in the start segment, as is the case in the position SZ1 in FIG. 2c during the writing of the field K3. Consequently, the preceding field K2 must be read out in this case, i.e. the reading start segment is the writing start segment I of the previous field, i.e. the segment Z according to FIG. 2b. By contrast, at the position SZ2 in FIG. 2c, at which the write pointer is already located in the second writing segment Z, the writing start segment Y can be taken as the reading start segment.

Generally, it can be derived from these considerations that 2*VD−1 segments, each having a storage capacity which corresponds to the quotient of the storage capacity required for an insertion picture and VD, are necessary in order to ensure in each case that either the currently written or the immediately preceding insertion picture can be read out. The total memory space required is thus (2−1/VD) times the storage capacity required for an insertion picture. The saving in comparison with the use of two memory areas for a respective insertion picture thus falls with increasing vertical decimation VD. Since the quotient of reading speed and writing speed can, to a good approximation, be applied as VD, the decisive criterion for the selection of the reading start segment is whether the last segment required for writing the current insertion picture is already being written to.

In the case of ⅓ picture-in-picture insertion, VD=3 and, in accordance with FIG. 3, it is necessary correspondingly to choose 2*VD−1=5 segments A, B, C, D and E each having a storage capacity of ⅓ field, with the result that a total storage capacity of ⅝ fields is required. In this case, too, memory segments I, II, III are cyclically overwritten, with the result that the first field is written to the segments A, B and C, the second field to the segments D, E and A, etc. Since the reading speed is about three times higher than the writing speed, the decision criterion to be applied here is whether more than 1/VD=⅓ of the memory space required for a field remains to be written to. Consequently, in this case, too, the resulting decision criterion is whether the last segment, in this case the third segment III, required for the current field is already being written to.

In addition to the elimination of the seam, it is furthermore possible to eliminate disturbances that may arise as a result of different field positions in the insertion channel 8 and main channel 7, e.g., in the case of a picture composed of line-offset fields, disturbances between the upper field in the main channel 7 and the lower field in the insertion channel 8. This can be ensured e.g. by storing an additional line, with the result that the lines of the upper field of the insertion channel, despite the dependence on the raster position of the field of the main channel, are always displayed relatively above the lines of the lower field of the insertion channel.

The invention claimed is:

1. A method for picture-in-picture insertion,
   wherein a sequence of insertion pictures decimated by vertical decimation are read into a memory device and subsequently read out,
   wherein the insertion pictures read out are inserted into a sequence of main pictures,
   wherein the memory device has a storage capacity of greater than one insertion picture but less than two insertion pictures and is subdivided into memory segments which are continuously overwritten by the insertion pictures,
   wherein a decision is made as to whether the currently written insertion picture or the immediately preceding insertion picture is read out,
   wherein more than one memory segment of the memory device is required for storing an insertion picture, and in that the memory segments of the memory device are cyclically overwritten by the insertion pictures in a predetermined order, and
   wherein in a manner dependent on the ratio of a reading speed of a read pointer to a writing speed of a write pointer and a relative position of the write pointer in a writing area holding the currently written insertion picture, a decision is made as to whether the currently written insertion picture or the immediately preceding insertion picture is read out.

2. A method for picture-in-picture insertion,
   wherein a sequence of insertion pictures decimated by vertical decimation are read into a memory device and subsequently read out,
   wherein the insertion pictures read out are inserted into a sequence of main pictures,
   wherein the memory device has a storage capacity of greater than one insertion picture but less than two insertion pictures and is subdivided into memory segments which are continuously overwritten by the insertion pictures,
   wherein a decision is made to whether the currently written insertion picture or the immediately preceding insertion picture is read out,
   wherein more than one memory segment of the memory device is required for storing an insertion picture, and in that the memory segments of the memory device are cyclically overwritten by the insertion pictures in a predetermined order, and
   wherein the memory device has a storage capacity which is (2−1/VD) times the storage capacity required for an insertion picture, where VD is the vertical decimation of the insertion picture.

3. The method of claim 2 wherein the memory of segments are the same size and the number of memory segments 2*VD−1, the number of memory segments required for an insertion picture corresponding to the vertical decimation (VD).

4. The method of claim 3 wherein a memory segment has a storage capacity of 1/VD times the storage capacity required for an insertion picture and the decision criterion that is applied is whether the last memory segment required for the currently written insertion picture is already being written too.

5. The method of claim 2 wherein the insertion pictures and main pictures are fields of a monitor picture.

6. A method for picture-in-picture insertion,
wherein a sequence of insertion pictures decimated by vertical decimation are read into a memory device and subsequently read out,
wherein the insertion pictures read out are inserted into a sequence of main pictures,
wherein the memory device has a storage capacity of greater than one insertion picture but less than two insertion pictures and is subdivided into memory segments which are continuously overwritten by the insertion pictures,
wherein a decision is made as to whether the currently written insertion picture or the immediately preceding insertion picture is read out,
wherein more than one memory segment of the memory device is required for storing an insertion picture, and in that the memory segments of the memory device are cyclically overwritten by the insertion pictures in a predetermined order, and
wherein a comparison is made to determine whether a main picture and an insertion picture to be inserted into the latter have identical field position, and, in the case of a differing field position, an identical field position is achieved by address shifting of the main picture or of the insertion picture.

7. A circuit arrangement for picture-in-picture insertion, comprising:
a memory device for storing vertically decimated insertion pictures, the memory device having a storage capacity of greater than one insertion picture but less than two insertion pictures and being subdivided into memory segments which can be continuously overwritten by the insertion pictures;
a control device for reading out the vertically decimated insertion pictures from the memory device and for inserting the insertion pictures read out into a sequence of main pictures; and
a decision device for deciding whether the currently written insertion picture or the immediately preceding insertion picture is read out,
wherein each memory segment has a storage capacity of less than one insertion picture,
the memory segments of the memory device can be cyclically overwritten by the insertion pictures in a predetermined order, and
wherein the memory device has a storage capacity which is $(2-1/VD)$ times the storage capacity required for an insertion picture, where VD is the vertical decimation of the insertion picture.

8. The circuit arrangement of claim 7 wherein the memory segments are the same size and the number of memory segments is $2*VD-1$, the number of memory segments required for an insertion picture corresponding to the vertical decimation (VD).

9. A circuit arrangement for picture-in-picture insertion, comprising:
a memory device for storing vertically decimated insertion pictures, the memory device having a storage capacity of greater than one insertion picture but less than two insertion pictures and being subdivided into memory segments which can be continuously overwritten by the insertion pictures;
a control device for reading out the vertically decimated insertion pictures from the memory device and for inserting the insertion pictures read out into a sequence of main pictures; and
a decision device for deciding whether the currently written insertion picture or the immediately preceding insertion picture is read out,
wherein each memory segment has a storage capacity of less than one insertion picture,
the memory segments of the memory device can be cyclically overwritten by the insertion pictures in a predetermined order, and
wherein in a manner dependent on the ratio of a reading speed of a read pointer to a writing speed of a write pointer and a relative position of the write pointer in a writing area holding the currently written insertion picture, the decision device decides whether the currently written insertion picture or the immediately preceding insertion picture is read out.

* * * * *